(12) United States Patent
Maslennikov

(10) Patent No.: US 10,052,656 B2
(45) Date of Patent: Aug. 21, 2018

(54) DEVICE AND METHOD FOR APPLYING A LIQUID COATING MATERIAL TO A PORTION OF A FASTENING ELEMENT

(71) Applicant: Airbus Operations GmbH, Hamburg (DE)

(72) Inventor: Johannes Maslennikov, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 18 days.

(21) Appl. No.: 15/226,453

(22) Filed: Aug. 2, 2016

(65) Prior Publication Data
US 2017/0036233 A1 Feb. 9, 2017

(30) Foreign Application Priority Data

Aug. 7, 2015 (EP) .................................... 15180267

(51) Int. Cl.
*A46B 11/06* (2006.01)
*B05D 1/28* (2006.01)
(Continued)

(52) U.S. Cl.
CPC ................ *B05D 1/28* (2013.01); *A46B 11/06* (2013.01); *A46B 11/063* (2013.01); *B05C 1/06* (2013.01);
(Continued)

(58) Field of Classification Search
CPC ... A46B 11/06; A46B 11/063; A46B 2200/20; B05C 1/06; B05C 17/00516; B05D 1/28; B64F 5/10; B64F 5/40
(Continued)

(56) References Cited

U.S. PATENT DOCUMENTS 5,360,026 A * 11/1994 Klinkhammer ........ A46B 5/002
132/308
5,360,084 A * 11/1994 Graf ..................... A46B 11/063
15/256.5
(Continued)

FOREIGN PATENT DOCUMENTS

EP 2492550 8/2012
JP 3079127 8/2000
(Continued)

OTHER PUBLICATIONS

European Search Report for Application No. 15180267 dated Feb. 12, 2016.

*Primary Examiner* — Jennifer C Chiang
(74) *Attorney, Agent, or Firm* — Jenkins, Wilson, Taylor & Hunt, P.A.

(57) ABSTRACT

A device for applying a liquid coating material to a portion of a fastening element projecting from a surface of a first component fastened to a second component by the fastening element. A bristle arrangement comprising a carrier structure defining an interior space and a first opening. The carrier structure comprises an annular portion extending from the first opening and extending around an entire circumference of the interior space. The bristle arrangement comprises bristles secured to the carrier structure and extending from the carrier structure into the interior space. A casing comprises an interior chamber, a second opening wherein objects are insertable from outside the casing through the openings into the interior space, and at least one through-hole providing access to the plurality of bristles and allowing introduction of a liquid coating material into the interior chamber and to the bristles. A method is disclosed for applying liquid coating material.

14 Claims, 4 Drawing Sheets

(51) Int. Cl.
*B05C 1/06* (2006.01)
*B05C 17/005* (2006.01)
*F16B 33/00* (2006.01)
*B64F 5/10* (2017.01)
*B64F 5/40* (2017.01)

(52) U.S. Cl.
CPC ..... *A46B 2200/20* (2013.01); *B05C 17/00516* (2013.01); *B64F 5/10* (2017.01); *B64F 5/40* (2017.01); *F16B 33/008* (2013.01)

(58) Field of Classification Search
USPC ........................................................ 401/289
See application file for complete search history.

(56) References Cited

U.S. PATENT DOCUMENTS

| | | |
|---|---|---|
| 9,061,313 B1 | 6/2015 | Williams et al. |
| 2015/0064357 A1 | 3/2015 | Tomuta et al. |

FOREIGN PATENT DOCUMENTS

| | | |
|---|---|---|
| JP | 2004 016305 | 1/2004 |
| JP | 2014 117686 | 6/2014 |

\* cited by examiner

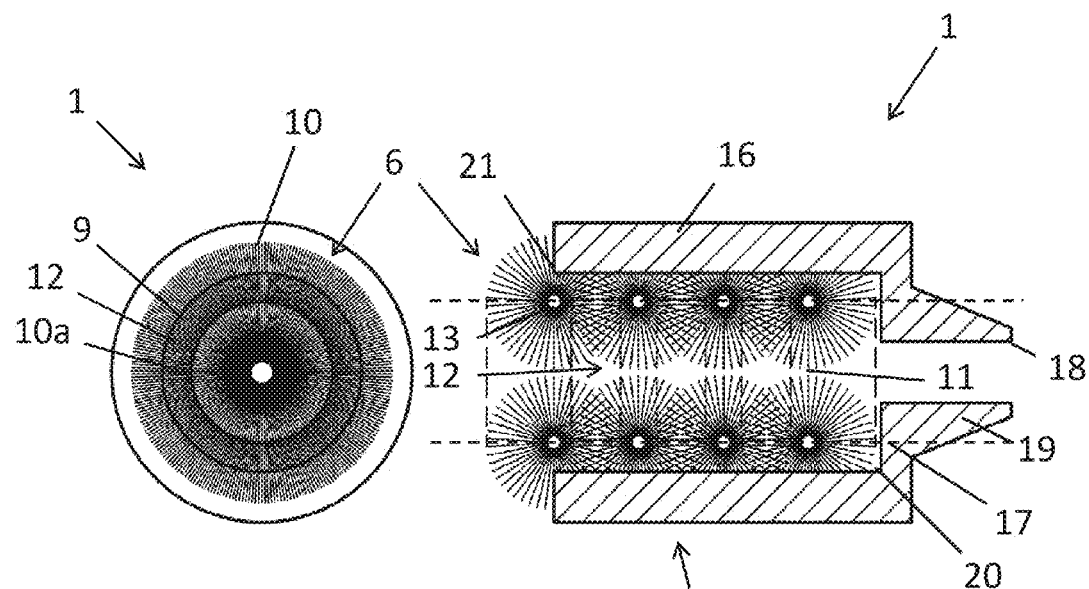
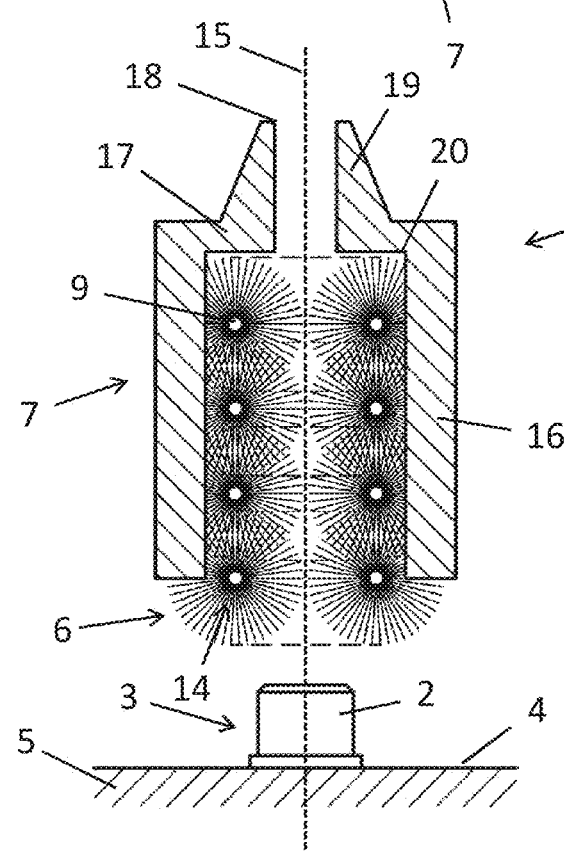
Fig. 1
Fig. 2
Fig. 3

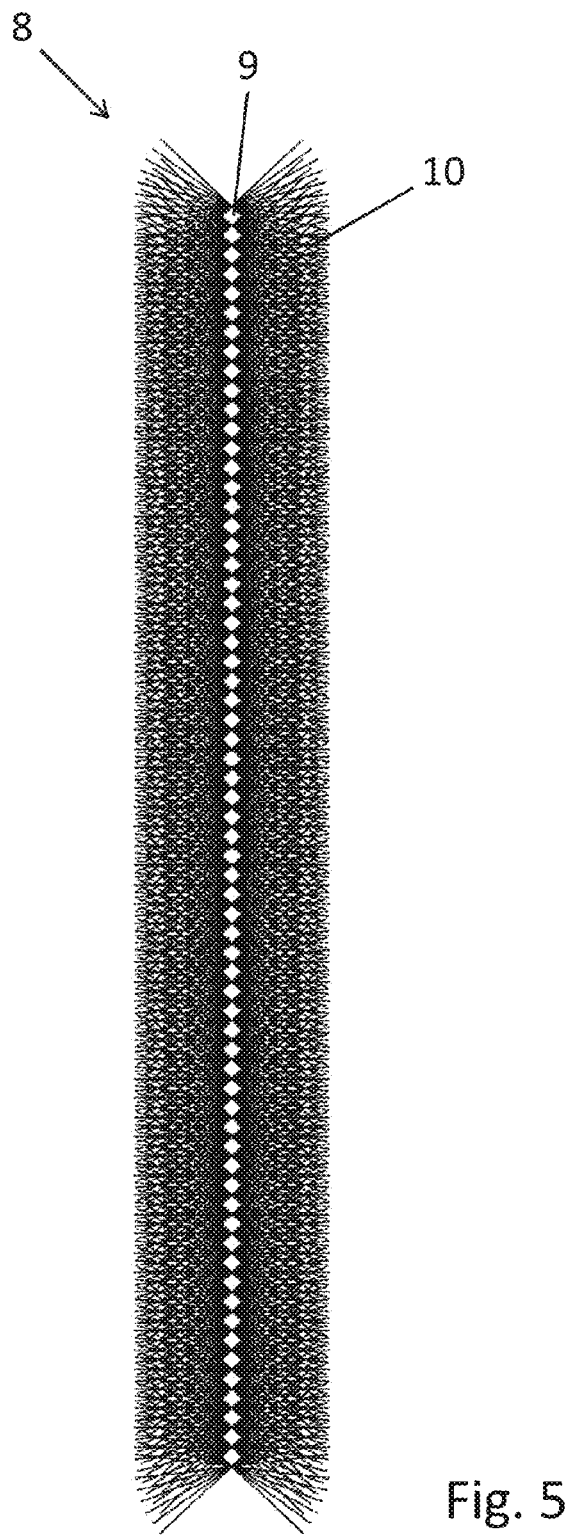
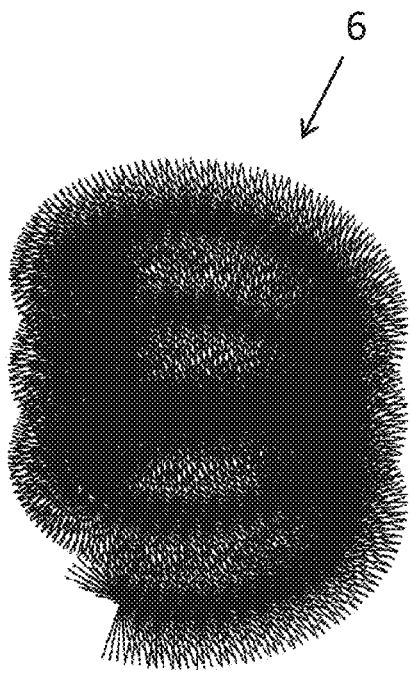
Fig. 5
Fig. 6

DEVICE AND METHOD FOR APPLYING A LIQUID COATING MATERIAL TO A PORTION OF A FASTENING ELEMENT

CROSS-REFERENCE TO RELATED APPLICATION

This application claims priority to European Patent Application No. EP 15180267.5 filed Aug. 7, 2015, the entire disclosure of which is incorporated by reference herein.

TECHNICAL FIELD

The present application relates to a device for applying a liquid coating material to a portion of a fastening element projecting from a surface of a first component fastened to a second component by the fastening element.

BACKGROUND

In many fields of technology it is necessary to protect fastening elements, such as rivets, bolts or screws, which couple two components to each other, against damage by corrosion and other environmental influences. This applies in particular to the portion or portions of the fastening element projecting from the surface. For example, in aircraft manufacturing structural components of an aircraft are typically interconnected by rivets, wherein portions of the rivets project from the combined surface of the structural components.

It is common practice to apply or re-apply a protective coating to any projecting portions of a fastening element, and preferably also to the surrounding area of the surface from which the fastening element is projecting, after the fastening element has been put in place to secure to components to each other. Corresponding processes have to take into consideration that the projecting portions may have very different shapes and dimensions and that they may have complex geometries, such as undercuts.

One known process for applying a protective coating to projecting portions of fastening elements is by manually using a brush in order to apply a liquid coating material to the projecting portions and the surrounding surfaces. While this approach allows in principle for a reliable application of coating material, it is time consuming and involves a high workload under often poor ergonomic conditions.

A further known process utilizes an airbrush for applying liquid coating material. As is typical for methods employing an airbrush, the process requires safety measures, such as a suction and/or filtration mechanism and protective suits or masks, for protecting workers and surrounding areas from coating material aerosol. These safety measures have an impact on the overall energy consumption and on the ergonomics of the process.

Applying a protective coating by an immersion bath is not possible for large components, and it is technically challenging to achieve a constant coating material thickness and to limit the amount of coating material to the amount necessary to protect the fastening elements.

SUMMARY

It is an object of the present disclosure to provide a device, which is of simple construction and which allows to reliably, easily and quickly apply a protective coating to projecting portions of fastening elements having different shapes and geometries and being of complex geometries, while at the same time limiting the amount of coating material, and a corresponding method.

This object is achieved by a device having the features disclosed herein. Preferred embodiments of the device are the subject-matter of the respective dependent claims.

According to the present disclosure a device is provided, which is adapted for applying a liquid coating material to a portion of a fastening element projecting from a surface of a first component fastened to a second component by the fastening element. The first and second components may be, in particular, structural or non-structural components of an aircraft, but may also be other structural or non-structural components, e.g. components of a vehicle, such as a ship, a car, a submarine or a train. The device comprises generally a bristle arrangement and a casing in which the bristle arrangement is disposed. The fastening element may be, e.g., a rivet, a bolt or a screw.

The bristle arrangement comprises a carrier structure for a plurality of bristles. The carrier structure defines an interior space and a first opening providing access to the interior space from an exterior of the carrier structure. It is to be noted that the carrier structure does not need to provide a closed structure in the form of closed walls completely enclosing the interior space with the exception of the first opening, although this is possible. Rather, the carrier structure may be an open structure having multiple openings in addition to the first opening, but surrounding the interior space. For example, the carrier structure may comprise one or more elongate or wire-shaped elements which are disposed to surround and define an interior space.

In any case, the carrier structure comprises an annular portion extending from the first opening and extending around an entire circumference of the interior space. Again the annular portion does not need to be a closed structure, but may be and open structure and does not need to include an annularly closed element, although this is again possible. For example, the annular portion may be constituted by a helically shaped elongate element. Due to the annular portion extending from the first opening, the first opening is defined by the annular portion defines and delimited by a circumferentially extending edge of the annular portion.

The plurality of bristles is secured to the carrier structure and extends from the carrier structure into the interior space. The ends of the bristles remote from the carrier structure may define a lumen inside the interior space free of bristles, but preferably the bristles are arranged such that no such free lumen is present, i.e. such that it is not possible to introduce an object into the interior space without contacting bristles. The latter configuration has the advantage that for any fastening element the entire surface of the projecting portion of the fastening element is always contacted by bristles, regardless of how the device is used. As will be explained in more detail below, the presence of a lumen may or may not require movement of the device on the projecting portion to guarantee that the entire surface is coated. Preferably, the bristles secured to the annular portion of the carrier structure provide an annularly closed portion of the entire bristle arrangement. Further, the plurality of bristles may include bristles extending perpendicularly with respect an interior wall of the casing or the support structure and/or bristles extending at a different angle with respect to the interior wall. In one example with bristles extending perpendicularly to a closed annular portion of the support structure, the support structure may be formed by bending a planar flexible support element, from one surface of which bristles extend perpendicularly, into a tubular shape with the bristles being located within the interior of the tubular shape.

The casing comprises an interior chamber in which the plurality of bristles are located, and a second opening providing access from an exterior of the casing to the interior chamber, to the first opening and the interior space, such that objects are insertable from outside the casing through the first and second openings into the interior space of the carrier structure. Thus, as will be explained below, it is in particular possible to insert a projecting portion of a suitably dimensioned fastening element through the first and second openings into the interior space. The insertion direction may be, in particular, an axial direction defined by the first and second openings and by the annular portion of the carrier structure.

The casing also comprises one or more through-holes providing access to the plurality of bristles and allowing introduction of a liquid coating material into the chamber and to the plurality of bristles. The bristles are preferably arranged such that a liquid introduced through the one or more through-bores is distributed within the bristles by capillary action. This provides the advantage that only one or only a few through-holes are sufficient to reliably and uniformly distribute the liquid coating material throughout the plurality of bristles.

The above-described device is of a very simple construction, which can even be provided as a disposable device, and allows locally and reliably applying liquid coating material to a projecting portion of a fastening element, even if the projecting portion has a complex geometry. It is merely necessary to arrange the device over the projecting portion of the fastening element, such that the projecting portion is inserted through the first and second openings into the interior space, and introduction of liquid coating material through the through-hole into the chamber such that the liquid coating material is applied to the plurality of bristles and by the plurality of bristles to the projecting portion. The introduction of the liquid coating material may be carried out before and/or after inserting the projecting portion into the interior space. The use of the device allows for limiting the amount of liquid coating material applied and does not require a costly infrastructure, such as the safety measures mentioned above.

Further, the device is able to accommodate fastening elements having a range of different dimensions. In particular, any projecting portion of a fastening element can be handled, as long as the projecting portion comes into contact with the bristles over its entire surface. This is always guaranteed if no lumen free of bristles is present, as already noted above. If such lumen does exist, it may be necessary to carry out translational and/or rotational movement of the casing while the projecting portion of a fastening element into the interior space. In some cases without a lumen, such movement may nevertheless be advantageous for further enhancing the coating result. However, it is to be noted that upon inserting the projecting portion of a fastening element into the interior space, bristles are displaced and compacted by the projecting portion, so that liquid coating material is effectively pressed out of the bristles and can thereby even reach and coat regions of the surface of the projecting portion not in direct contact with bristles. It is further advantageous that due to the presence of the bristles the device has an integrated tolerance compensation mechanism with respect to the insertion of the projecting portion of a fastening element, in that it is not necessary to precisely insert such projecting portion into a narrow rigid housing. Rather, the projecting portion can be inserted anywhere through the first and second openings, and the displacement of the bristles by the projecting portion during insertion thereof has the beneficial effect that the displaced bristles apply a force to the projecting portion guiding the projecting portion into a predetermined position inside the interior space. Therefore, it is not necessary to precisely position the device with respect to a projecting portion, but nevertheless the projecting portion will eventually be in a predetermined position inside the interior space by an automated guiding function. This is advantageous both for manual and automatic use of the device.

Thus, the annular portion of the bristle arrangement may also be sufficient to apply liquid coating material to a top of the projecting portion of a fastening element. As explained above, this may be achieved by providing that at least some of the bristles are arranged such that no lumen free of bristles remains in at least a portion of the interior space or that the lumen is of a size that allows application of coating material to the entire surface of a projecting portion in another manner, e.g. by the above mechanism, or by effecting movement of the casing while the projecting portion is inserted in the interior space, as likewise already explained above. In addition or alternatively, the carrier structure of the bristle arrangement may also include a cover portion on a side of the interior space opposite the first opening, and bristles secured to the cover portion of the carrier structure extend into the interior cavity in a direction towards the first opening. Such bristles are effective for applying liquid coating material to a top of a projecting portion of a fastening element. Preferably, they are arranged to constitute a closed wall of bristles. However, it is preferable not to make use of such a cover portion, because it renders the construction of the device slightly more complex.

It can already be taken from the above explanations that the bristles of the device having the above configuration generally advantageously provide three different functions. They do not simply apply liquid coating material to the surface of the projecting portion of a fastening element, but also distribute the liquid coating material throughout the bristles of the entire bristle arrangement, for example by capillary action. Moreover, they actually store liquid coating material between the bristles, so that it may be possible to coat two or more fastening elements in a row without having to introduce new coating material into the interior space 12. It is then advantageously only necessary to refill the bristles with coating material from time to time.

The first opening may be a part of the second opening or may be identical to the second opening.

In a preferred embodiment the carrier structure is a wall structure or a portion of a wall structure of the casing. In other words, the plurality of bristles is secured to the casing itself. The wall structure or portion of a wall structure may be, e.g., a side wall or a portion of a side wall, wherein the side wall may be, e.g., cylindrical. This embodiment provides the advantage that no separate carrier structure is required.

In an alternative preferred embodiment the carrier structure is separate from and mounted to a wall structure of the casing. In this case the carrier structure is disposed inside the interior chamber of the cavity. This embodiment provides the advantage that it is avoided having to secure the plurality of bristles to an interior wall limiting the chamber, but that a simple carrier structure preconfigured with the bristles can be inserted into the chamber when manufacturing the device. For example, the carrier structure may advantageously comprise one or more elongate or wire-shaped elements to which the plurality of bristles are secured and from which they extend in a radial direction. Such elongate or wire-shaped elements provided with bristles may take the form of pipe cleaners, i.e. simple pipe cleaners may be used to form or construct the bristle arrangement. In an advantageous arrangement the annular portion of the carrier structure is formed or constituted by a plurality of such elongate or wire-shaped elements, wherein each such element is annularly closed. The annularly closed elongate or wire-shaped elements may then be arranged spaced from each other along an axis of the annular portion. Alternatively, the annular portion of the carrier structure may be formed or constituted by one or more of such elongate or wire-shaped elements, wherein each such element has a helical or spiral shape. Each annularly closed elongate or wire-shaped element then extends helically around and along the annular portion.

In a preferred embodiment the plurality of bristles includes a sub-set of bristles which extend from the first and second openings to the exterior of the casing, and the bristles of the sub-set are arranged around the entire circumference of the first opening. This construction advantageously allows applying liquid coating material also to the surface from which the portion of the fastening element projects in a limited area of the surface surrounding the projecting portion. Thus, coating material may be applied in a single step both to the projecting portion of the fastening element and to an adjacent surface area. It is merely necessary to bring the bristles of the sub-set into contact with the surface area.

In a preferred embodiment the bristles of the plurality of bristles secured to the annular portion of the carrier structure defines a continuous annularly closed wall of bristles. This construction further facilitates the uniform application of coating material to a projecting portion of a fastening element.

In a preferred embodiment the interior chamber is cylindrical and/or the interior space is cylindrical, but other shapes are also possible. Further, the interior chamber may be conical or of another configuration tapering in a direction away from the second opening. Further, the casing may be a hollow cylinder or may comprise a portion having the shape of a hollow cylinder, and may also be conical or of another tapering configuration. It is to be noted that it is also possible to adapt the shape and the dimensions of the interior space to a particular type of fastening element having a defined shape, but a range of dimensions, of at least a portion of the fastening element intended to project from a surface of a component when fastened to another component. For example, the shape and dimensions of the interior space could be specifically adapted for a particular shape and diameters of between 20 and 25 mm, such that the application of coating material by the bristles is particularly good for such fastening elements.

In a preferred embodiment the device further comprises a reservoir for liquid coating material, one or more conduits for coupling the reservoir to the one or more through-holes, and a pump mechanism operable to pump liquid coating material from the reservoir to the through-hole. The pump mechanism may be directly applied to the reservoir, so that they may essentially form a single element and the pump mechanism may, e.g., be actuatable with the hand holding the reservoir. Alternatively, in a particularly preferred embodiment the reservoir is an element separate from the pump mechanism and the reservoir and the pump mechanism are connected by a flexible tube or conduit through which liquid coating material stored inside the reservoir can be pumped by the pump mechanism out of the reservoir. The pump mechanism is coupled or directly applied to the casing or the one or more through-holes, so that—in the preferred case of the pump mechanism being manually operable—the pump mechanism is actuatable with the hand holding the casing. The reservoir can be secured, e.g., to a wall or other support structure or even to the body of the operator, so that large volumes of liquid coating material can be stored, while the tube or conduit allows the operator to move around with the casing and use it to apply liquid coating material to fastening elements. In any case, although the reservoir may include a rigid container, in a particular preferred embodiment the reservoir includes a flexible container. When completely filling such a flexible container with liquid coating material the liquid coating material can be pumped out of the flexible container without entrapped air. It is to be noted that it is also possible that the device itself does not include the reservoir, but that it, and in particular the pump mechanism, is adapted for coupling to an external reservoir. In this case, the device may or may not include the flexible tube or conduit.

The pump mechanism may be very simple and may be manually operable or automatically operable, e.g. under the control of a controller. In the latter case it may be advantageous if the device also comprises a sensor configured to detect an amount of liquid coating material applied to the bristles of the bristle arrangement. Such sensor is then coupled to a controller which is operable to control the pump mechanism on the basis of the detected amount of liquid coating material. This allows for a particularly consistent and limited application of coating material. However, a pump mechanism which is manually operable is preferred, because then the device is of simpler and smaller construction and is also easily usable, much like a paintbrush, at remote locations which are difficult to access and which have very different orientations. Further, the device is operable independently and does not require an external energy source or an external source of liquid coating material. In any case, it is advantageously possible to use a pump mechanism which provides with each pump stroke a defined pump volume or discharge quantity of coating material, wherein the defined pump volume per pump stroke may preferably be adjustable to be able to better adapt to device to a larger variety of different fastening elements. Even more preferably, however, in the case of a manual pump mechanism the pump mechanism is configured such that the amount of coating material discharged to the bristles can be adjusted by varying the manner of actuating the pump mechanism, e.g. by selectively choosing different pump strokes. Then, the operator may flexibly and very quickly adjust the amount of coating material based on a visual inspection of the fastening element or fastening elements previously coated. For example, the manually operable pump mechanism may comprise an actuator movable by an operator to operate the pump mechanism, and the actuator may allow for a defined range of movement corresponding to a defined range of pump strokes, so that the operator is able to adjust the amount of coating material discharged by the pump mechanism by varying the amount of movement of the actuator.

In a preferred embodiment the device further comprises a movement mechanism operable for moving the casing and the carrier structure in the axial, radial and/or circumferential direction of the annular portion. Such movement, which may alternatively also be effected manually, may improve and speed up the application of coating material as well as the distribution of the coating material between the bristles.

The device according to any of the above-described embodiments may be part of an apparatus which includes one or more further devices according to any of the above-described embodiments. The plurality of devices are disposed in a predetermined or adjustable arrangement, such that the apparatus can be used to simultaneously apply liquid coating material to a corresponding plurality of fastening elements having projecting portions in a corresponding arrangement. The one or more through-holes of the devices may be advantageously connected to a common source of liquid coating material, such as to a common reservoir, as mentioned above, and may advantageously utilize a common pump mechanism and, in the case of an automatically operable pump mechanism, preferably also a common controller, as likewise mentioned above.

The device according to any of the above-described embodiments and the above-described apparatus can be advantageously used in a method for applying a liquid coating material to a portion of a fastening element or portions of fastening elements projecting from a surface of a first component fastened to a second component by the fastening element or fastening elements. As already explained above, the method comprises the steps of arranging the device or devices over the projecting portion or portions of the fastening element or fastening elements such that each projecting portion is inserted through the first and second openings into the interior space of a device, and introducing liquid coating material through the one or more through-hole of each device into the chamber such that the liquid coating material is applied to the plurality of bristles and by the plurality of bristles to the respective projecting portion.

BRIEF DESCRIPTION OF THE DRAWINGS

In the following, an exemplary embodiment of the device will be explained with reference to the attached drawings.

FIG. 1 shows a schematic cross-sectional view of an embodiment of a device according to the present disclosure.

FIG. 2 shows a view from below of the device of FIG. 1.

FIG. 3 shows a schematic cross-sectional view of the device of FIG. 1 placed above and spaced from a portion of a fastening element projecting from a surface of a component.

FIG. 5 shows a schematic perspective view of a conventional pipe cleaner.

FIG. 6 shows the pipe cleaner of FIG. 5 after it has been bent into a helical shape to form a brush arrangement for use in the device of FIGS. 1 through 4.

DETAILED DESCRIPTION

Figure 4:
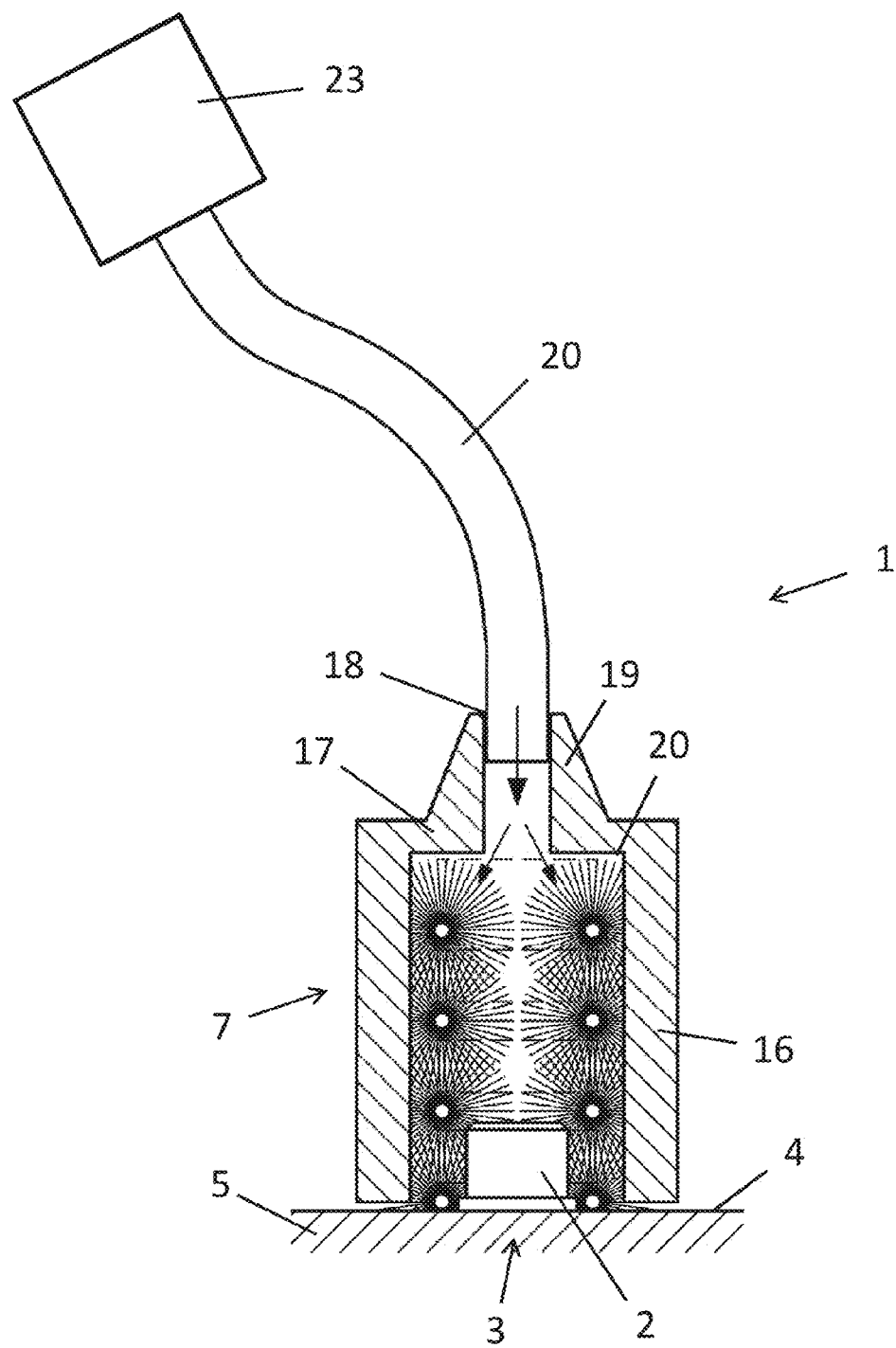
FIG. 4 shows a schematic cross-sectional view of the device of FIG. 1 corresponding to FIG. 3, but after arranging the device on the projecting portion of the fastening element and in contact with the surrounding surface of the component.

The device 1 shown in FIGS. 1 through 4 is specifically adapted for applying a liquid coating material to a portion 2 of a fastening element 3 projecting from a surface 4 of a component 5 fastened to another component by the fastening element 3. In the illustrated example the component 5 is a structural component of an aircraft, such as a fuselage section, and the fastening element 3 may be a rivet or a bolt, with the projecting portion 2 being, e.g., a rivet head or a bolt heat. The other component (not shown) may be, e.g., another structural component, such as another fuselage section or a stringer, or a non-structural component.

The device 1 comprises a bristle arrangement 6 and a casing 7 in which the bristle arrangement 6 is disposed.

In the exemplary embodiment shown, the bristle arrangement 6 is constructed in a very simple manner from a conventional pipe cleaner 8 schematically illustrated in FIG. 5. The pipe cleaner 8 comprises a central, plastically deformable wire 9, from which a plurality of bristles 10 extend in a radial direction or essentially or generally in a radial direction. The plurality of bristles 10 are each secured at one of their opposite ends to the wire 9 and are arranged—with small spacings—along the entire length and about the entire circumference of the wire 9. It should be noted that it may be preferable if not all of the bristles 10 extend perpendicularly with respect to the wire 9, but if the bristles 10 cover a range of angles around a value of 90°, such as, e.g., a range of 80° to 100° with respect to the wire 9, as can be best seen for the bristles 10 at the two very end regions of the wire 9.

In order to form or construct the bristle arrangement 6, the wire 9 of the pipe cleaner 8 is bent into a generally helical shape, as schematically illustrated in FIG. 6, and this is preferably done in such a manner that a plurality of levels are generated in each of which the wire 9 extends in a segment of a circle, as can be seen in the cross-sectional views of FIGS. 1, 3 and 4. Further, the shape of the wire 9 is chosen such that bristles 10 of adjacent levels are in contact with each other and that bristles 10 extending from opposite portions of the wire 9 in a level also contact each other or are spaced from each other by a small distance only. The latter option is illustrated in the cross-sectional views of FIGS. 1, 3 and 4, which show that a small-diameter lumen 11 is defined inside the bristle arrangement 6 and extends in an axial direction defined by the helical wire 9. The figures show the lumen 11 essentially for ease of illustration. As will become apparent from the below explanations, if a lumen 11 is present the device 1 needs to be moved from side to side in order to guarantee that liquid coating material is applied by the bristles 10 to the entire surface of the projecting portion 2 of the fastening element 3. Therefore, it is preferred for the bristles 10 to be arranged such that no free lumen is present, i.e. such that it is not possible to introduce the projecting portion 2 of a fastening element 3 into an interior space 12 defined by the helical wire 9 without contacting bristles 10 over the entire surface thereof.

The wire 9 constitutes an open helical carrier structure for the plurality of bristles 10, which carrier structure defines the interior space 12, which is the cylindrical space inside the imaginary cylinder jacket on which the wire 9 extends and which is indicated by two dashed lines in FIG. 1. The carrier structure 9 further defines a circular first opening 13 providing access to the interior space 12 from an exterior of the carrier structure 9.

Thus, and as can be seen in FIGS. 1, 3 and 4, the carrier structure 9 constitutes an annular portion 14 in the form of an axially extending, largely open cylinder jacket extending from the first opening 13, i.e. the cylinder jacket corresponding to the portion of the dashed lines of FIG. 2 between the first opening 13 and the remote end of the carrier structure 9. The annular portion 14 extends axially along the central cylinder axis 15 illustrated as a dotted line 15 in FIG. 3 and extends around an entire circumference of the interior space 12. The first opening 13 is defined by an axial terminal edge of the annular portion 14, namely the lower circumferentially extending edge in FIGS. 3 and 4.

As is evident and as can be seen best in FIGS. 1 through 4 the plurality of bristles 10 includes a plurality of bristles 10a which extend at various angles from the carrier structure 9 into the interior space 12. The bristles 10a are roughly about half of the total number of bristles 10. Due to bristles 10a of adjacent levels of the carrier structure 9 contacting each other, as explained above, the plurality of bristles 10a provide an annularly closed portion of the entire bristle arrangement 6, i.e. an essentially closed wall of bristles 10a extending about the central axis 15.

In the illustrated embodiment the casing 7 has essentially the shape of a hollow cylinder and comprises a circumferentially extending side wall 16 constituting a hollow cylinder and closed at one end by a top or cover wall 17 provided with a central through-hole 18 extending through an integrally formed connector portion 19. The side wall 16 and the cover wall 17 define and delimit a cylindrical interior chamber 20 of the casing 7, in which interior chamber 20 the bristle arrangement 6 is located. The end of the side wall 16 opposite the cover wall 17 defines a circular second opening 21 providing access from an exterior of the casing 7 to the interior chamber 20 and being larger than the first opening 13. The first opening 13 is arranged coaxially with the second opening 21 with respect to the axis 15. Further, the first opening 13 is preferably arranged to be coplanar with the second opening 21, such that the first opening 13 forms a part of the second opening 21 (see FIGS. 1, 3 and 4), but it may in principle also be spaced from the second opening 21 either to be located slightly inside the interior chamber 20 or slightly outside the interior chamber 20. Consequently, in the illustrated embodiment the second opening 21 provides access not only to the interior chamber 20, but specifically to the first opening 13 and the interior space 12, such that the projecting portion 2 of the fastening element 3 can be inserted from outside the casing 7 through the first opening 13 and second opening 21 into the interior space 12 of the carrier structure 9. The insertion direction for such insertion is along the axis 15.

Some of the bristles 10 extend out of the second opening 21 to the exterior of the casing 7 and form an annularly closed circular terminal edge of the bristle arrangement 6.

As can be seen in FIGS. 1, 3 and 4, the through-hole 18 provides access to the plurality of bristles 10 and in particular to the plurality of bristles 10a. In FIG. 4 it is shown that the device 1 further comprises a flexible hose 22, which is coupled at one end thereof to the connector portion 19 of the cover wall 17 and at an opposite end to a combined liquid reservoir and pump mechanism 23, which is operable to store a liquid coating material and to selectively pump the liquid coating material through the hose 22 and through the through-hole 18 into the interior chamber 20 such that the liquid coating material is received by the bristles 10. The bristles 10 are closely spaced, so that the liquid coating material is uniformly distributed by capillary forces among the bristles 10 and in particular the bristles 10a, so that it is not necessary to provide for a plurality of through-holes distributed uniformly about the casing 7.

In order to apply liquid coating material stored in the liquid reservoir and pump mechanism 23, which may include a manually or automatically operable pump, to the projecting portion 2 of the fastening element 3 and to a limited area of the surface 4 surrounding the projecting portion 2 the casing 7 is positioned above the projecting portion 2 such that the first and second openings 13, 21 are pointing downwardly and the axis 15 is aligned with the central axis of the projecting portion 2, as illustrated in FIG. 3. Then, the casing 7 is moved downwardly over the projecting portion 2 such that the projecting portion 2 is inserted through the first and second openings 13, 21 into the interior space 12 and the interior chamber 20 until the casing 7 reaches the position illustrated in FIG. 4, in which the support structure 9 and in particular the axial terminal edge thereof defining the first opening 13 is located as close as possible to the surface 4 and in which the projecting portion 2 is coaxially disposed inside the interior space 12 and the bristles 10 extending out of the second opening 21 to the exterior of the casing 7 and forming an annularly closed circular terminal edge of the bristle arrangement 6 are in contact with an annularly closed area of the surface 4 surrounding and immediately adjoining the projecting portion 2.

As can be seen from FIGS. 3 and 4, during the insertion of the projecting portion 2 along an insertion direction defined by the common central axis 15 of the casing 7, the interior chamber 20, the helical support structure 9 and the interior space 12, the projecting portion 2 contacts and displaces some of the bristles 10a, which in this process move or stroke over the surface of the projecting portion 2, similar to the bristles of a brush, and thereby apply the liquid coating material to the surface of the projecting portion 2. Further, the bristles 10 of the annularly closed circular terminal edge of the bristle arrangement 6 apply the liquid coating material to the immediately surrounding area of the surface, so that a continuous protective layer of liquid coating material is eventually formed over the projecting portion 2 and the adjacent surface area, thereby projecting both the projecting portion 2 itself and the portion of the fastening element 3 inside the component 5.

In order to improve the uniformity and continuity of the protective layer the casing 7 may be moved, manually or automatically by a suitable movement mechanism, e.g. up and down in the direction of the axis 15 and/or rotationally in a reciprocating manner about the axis 15. As noted above, this may be necessary in case of the presence of a free lumen 11.

Figure 7:
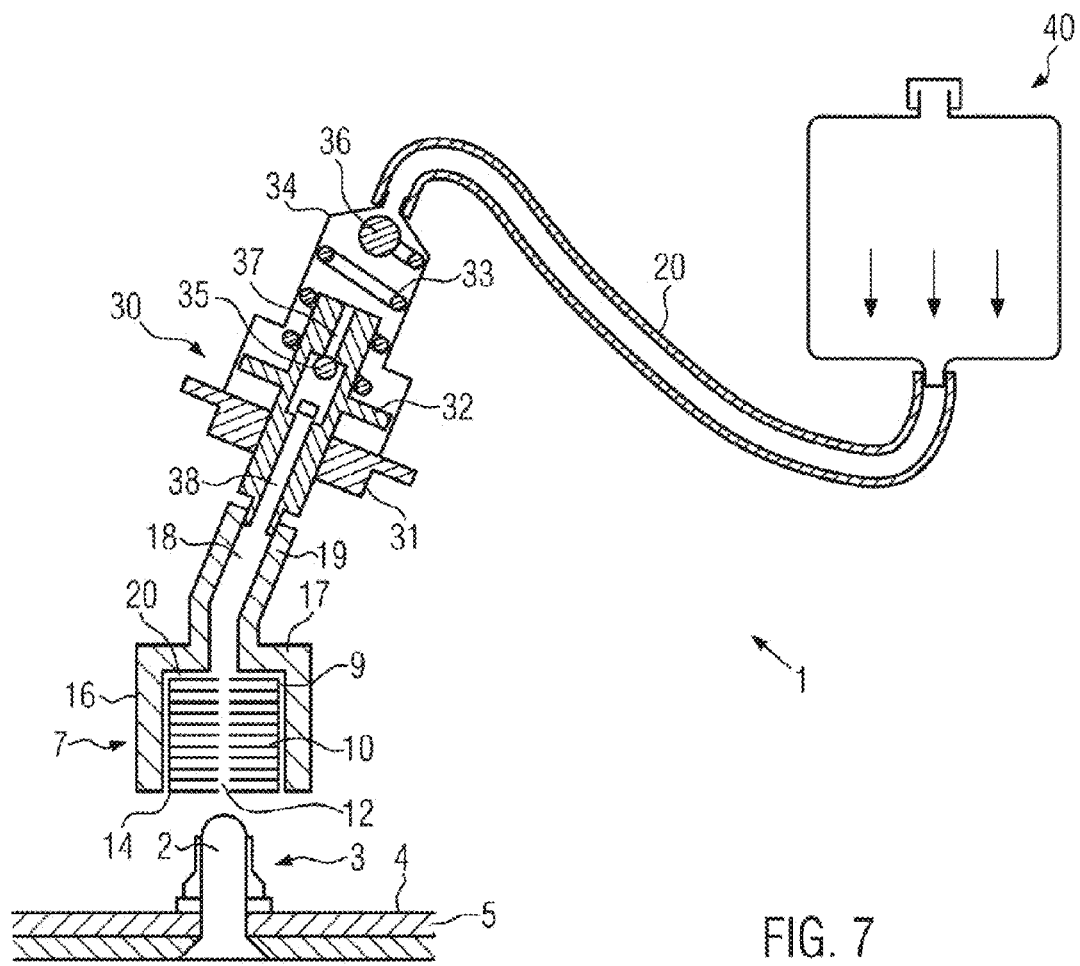
FIG. 7 shows a schematic cross-sectional view of another embodiment of a device according to the present disclosure.
Figure 8:
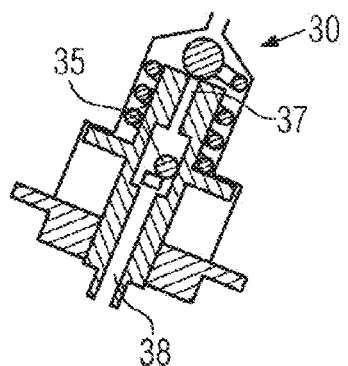
FIG. 8 shows a schematic cross-sectional view of the pump mechanism of the embodiment of FIG. 7 in the actuated state.

FIGS. 7 and 8 illustrate an alternative embodiment of the device 1.

One difference of this embodiment as compared to the preceding embodiment is the configuration of the carrier structure 9 and the bristles 10. The carrier structure 9 shown in FIG. 7 is a closed hollow cylinder which is inserted and mounted concentrically inside the interior chamber 20 and which defines and encloses the interior space 12. All of the bristles 10 extend perpendicularly or essentially perpendicularly from the cylindrical wall provided by the carrier structure 9 into the interior space 12. Although a lumen 11 free of bristles 10 is present in the axial region of the interior space 12, the displacement and compaction of the bristles 10 by the projecting portion 3 upon inserting it into the interior space 12 causes liquid coating material stored by the bristles 10 to be applied also to the entire top surface of the projecting portion 3.

Moreover, the device 1 of FIGS. 7 and 8 comprises a manually operable pump mechanism 30 which is separate from a liquid reservoir 40 and connected to the liquid reservoir 40 by a flexible tube 20. The pump mechanism 30 is rigidly coupled to the connector portion 19 of the casing 20, so that the pump mechanism 30 and the casing 20 can be held in one hand. More specifically, an elongate element 32 of the pump mechanism 30, which element 32 is provided with an axial bore 38 extending between the two opposite longitudinal ends of the element 32, is rigidly connected at one longitudinal end to the connector portion 19 such that the bore 38 is in fluid communication with the through-bore 18. The element 32 is movable inside a housing 34, which is rigidly connected to an element 31, through which the element 32 extends and with respect to which the element 32 is movable in the axial direction. A compression spring 33 is supported between an interior of the housing 34 and a projection of the element 32, so that the element 32 is biased towards the projection 19 into the position shown in FIG. 7. In this position, a spherical valve element 35 closes a restricted section 37 of the bore 38.

In order to actuate the pump mechanism 30, the element 32 together with the casing 7 is moved relative to the element 31 such that the compression spring 33 is compressed. As illustrated in FIG. 8, the valve element 35 is then spaced from the restricted section 37 of the bore 38, so that fluid flow through the bore 38 is possible. In the maximum compressed position shown in FIG. 8 a further spherical valve element 36 closes the opposite end of the section 37 to block further fluid flow through the section 37. Thus, by effecting this movement, liquid coating material stored inside the reservoir 40 is pumped through the tube 20 and through the pump mechanism 30 into the interior space 12 and applied to the bristles 10.

Moreover, the reservoir 40 is provided in the form of a flexible bag, which allows pumping of liquid coating material from the reservoir 40 without entrapped air. For this purpose, the reservoir can be completely filled with liquid coating material. The reservoir 40 can be secured remotely, for example on a wall or on the body of the operator.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for applying a liquid coating material to a portion of a fastening element projecting from a surface of a first component fastened to a second component by the fastening element, the device comprising:
   a bristle arrangement comprising:
      a carrier structure which defines an interior space and a first opening providing access to the interior space from an exterior of the carrier structure, wherein the carrier structure comprises an annular portion extending from the first opening and extending around an entire circumference of the interior space; and
      a plurality of bristles secured to the carrier structure and extending from the carrier structure into the interior space; and
   a casing comprising:
      an interior chamber in which the plurality of bristles are located;
      a second opening providing access from an exterior of the casing to the interior chamber, such that objects are insertable from outside the casing through the first and second openings into the interior space of the carrier structure; and
      at least one through-hole providing access to the plurality of bristles and allowing introduction of a liquid coating material into the interior chamber and to the plurality of bristles.

2. The device according to claim 1, wherein the first opening is at least a part of the second opening.

3. The device according to claim 1, wherein the carrier structure is a wall structure of the casing.

4. The device according to claim 1, wherein the carrier structure is separate from and mounted to a wall structure of the casing.

5. The device according to claim 4, wherein the carrier structure comprises at least one wire-shaped element to which the plurality of bristles is secured and from which they extend in a radial direction.

6. The device according to claim 5, wherein the annular portion of the carrier structure is formed by a plurality of the wire-shaped elements which are annularly closed.

7. The device according to claim 5, wherein the annular portion of the carrier structure is formed by at least one of the wire-shaped elements which has a helical shape.

8. The device according to claim 1, wherein the plurality of bristles includes a sub-set of bristles which extend from the first and second openings to the exterior of the casing, wherein the bristles of the sub-set are arranged around the entire circumference of the first opening.

9. The device according to claim 1, wherein the bristles of the plurality of bristles secured to the annular portion of the carrier structure define a continuous annularly closed wall of bristles.

10. The device according to claim 1, wherein the interior chamber is cylindrical and/or wherein the interior space is cylindrical.

11. The device according to claim 1, further comprising a reservoir for liquid coating material, at least one conduit for coupling the reservoir to the at least one through-hole, and a pump mechanism operable to pump liquid coating material from the reservoir to the through-hole.

12. The device according to claim 11, wherein the pump mechanism is a manually operable pump mechanism comprising an actuator movable by an operator to operate the pump mechanism, and wherein the actuator allows for a defined range of movement corresponding to a defined range of pump strokes, so that the operator is able to adjust an amount of coating material discharged by the pump mechanism by varying an amount of movement of the actuator.

13. The device according to claim 1, further comprising a movement mechanism operable for moving the casing and the carrier structure in an axial, radial and/or circumferential direction of the annular portion.

14. An apparatus for applying a liquid coating material to a portion of each of a plurality of fastening elements projecting from a surface, wherein the apparatus comprises a plurality of devices according to claim 1 disposed in a predetermined or adjustable arrangement.

* * * * *